Jan. 12, 1960 J. B. WHITTED 2,920,740
METHOD OF POSITIONING INSERTS AND MACHINE THEREFOR
Filed Oct. 15, 1956 5 Sheets-Sheet 1

Inventor:
John B. Whitted
By: Schroeder, Hofgren,
Brady & Wegner
Attorneys

Jan. 12, 1960     J. B. WHITTED     2,920,740
METHOD OF POSITIONING INSERTS AND MACHINE THEREFOR
Filed Oct. 15, 1956     5 Sheets-Sheet 2
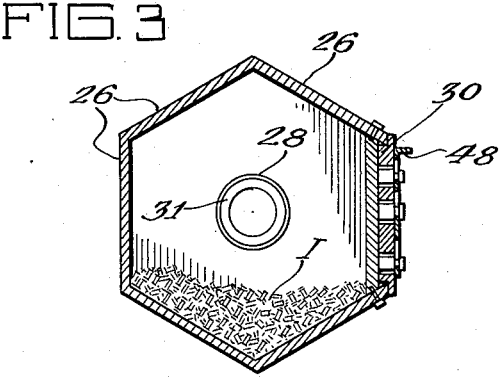
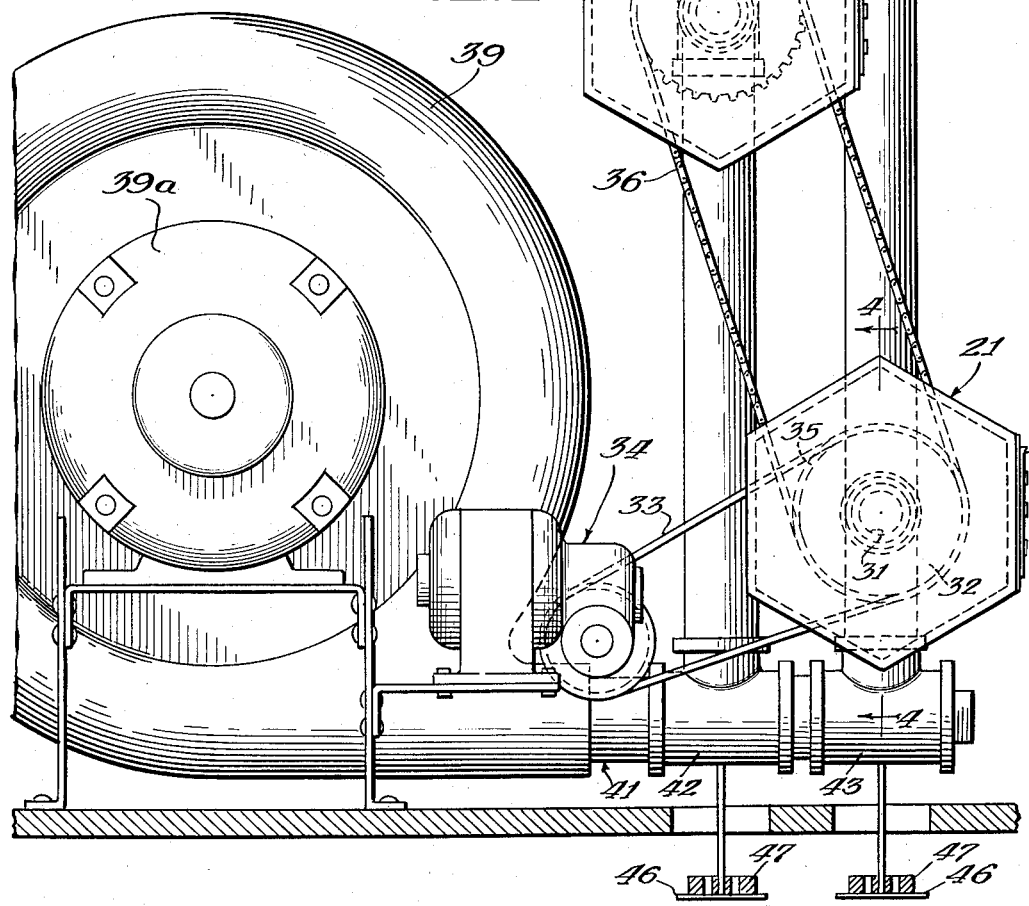
Inventor:
John B. Whitted
By Schroeder, Hofgren,
Brady & Wegner
Attorneys Jan. 12, 1960   J. B. WHITTED   2,920,740
METHOD OF POSITIONING INSERTS AND MACHINE THEREFOR
Filed Oct. 15, 1956   5 Sheets-Sheet 3

Inventor:
John B. Whitted
By: Schroeder, Hofgren,
Brady & Wegner
Attorneys

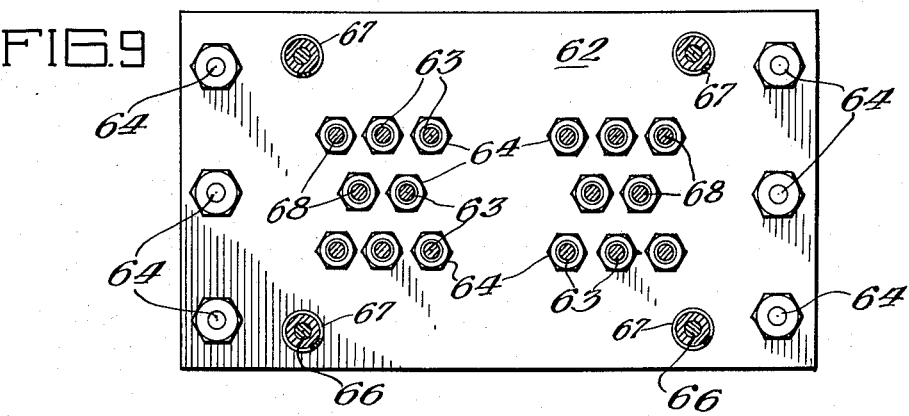
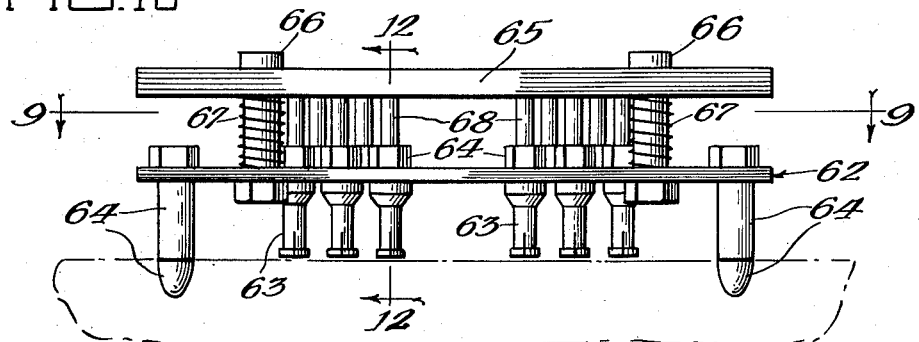
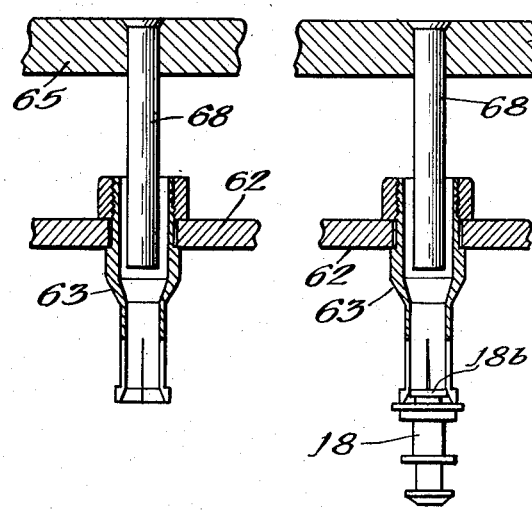
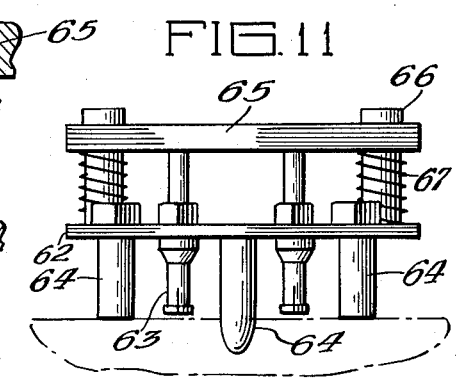

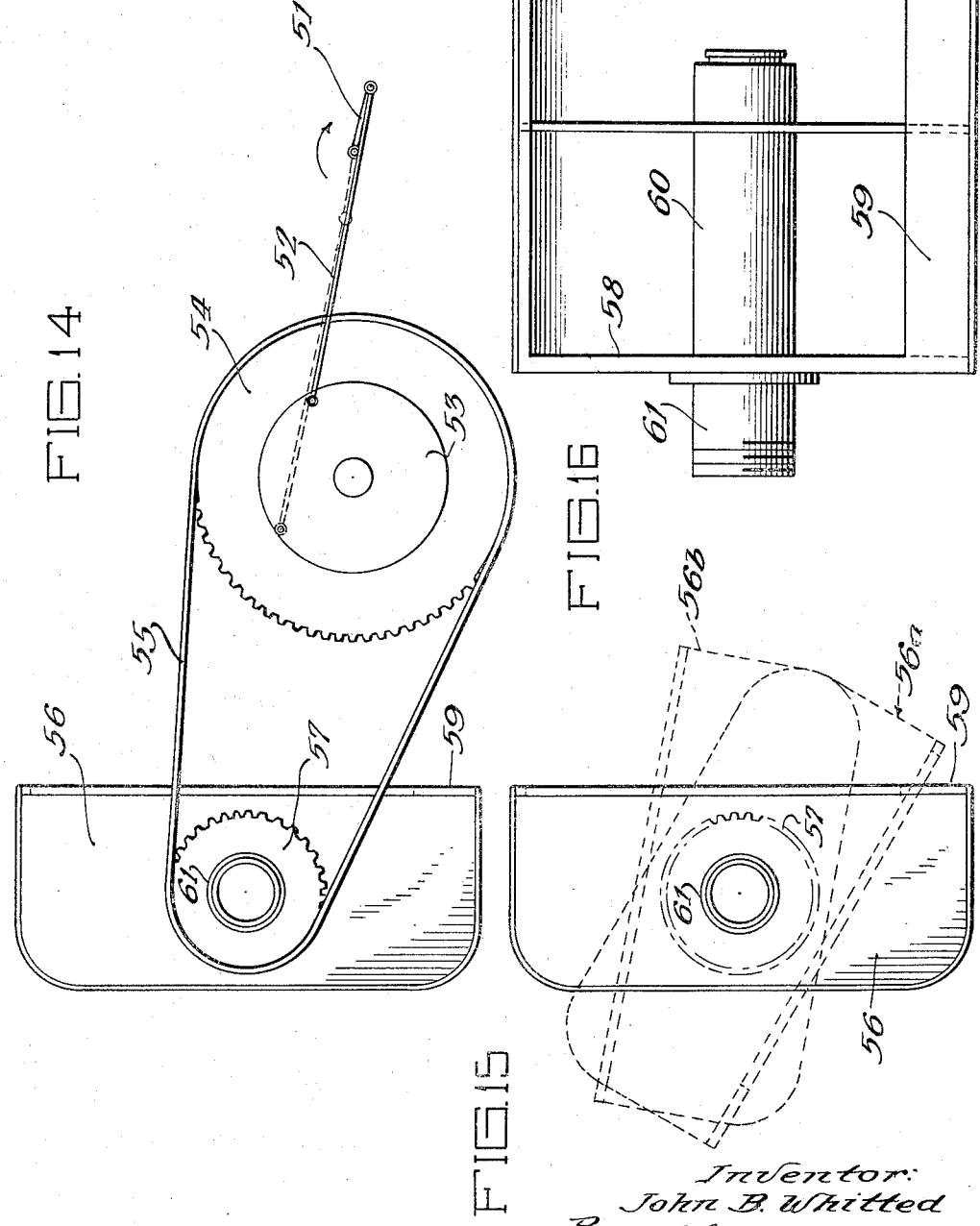

United States Patent Office 2,920,740
Patented Jan. 12, 1960

2,920,740

METHOD OF POSITIONING INSERTS AND MACHINE THEREFOR

John B. Whitted, Kenilworth, Ill., assignor to Whitso, Inc., a corporation of Illinois Application October 15, 1956, Serial No. 615,817

6 Claims. (Cl. 198—33)

This invention relates to a method and apparatus for gathering and orienting articles and more particularly to such a method and apparatus for operating with relatively small articles that are otherwise difficult to handle economically because of their size.

Many manufacturing and processing procedures require the handling of duplicate small parts or articles. For example, small metal or plastic inserts often require an insulating body of plastic to be molded about them and in performing this operation the small parts or articles have been usually placed in the molding dies by hand. This has been a time consuming and tedious operation which has placed serious limitations upon the output of molding machines.

The present method and apparatus is capable of gathering and orienting small parts or articles so that they may be placed into molds or dies as a group, thus eliminating the manual handling of the articles. In general, this is accomplished by causing the articles to move past orifices of a size to receive and retain the articles while maintaining a flow of air or other fluid through the orifices to induce the articles to enter the same.

The primary object of this invention is to provide a new and improved method and apparatus for handling articles.

Another object is to provide a method and apparatus for gathering articles in a pattern in which they are all oriented alike.

Another object is to provide a method and apparatus for gathering relatively small articles which will substantially lower the cost of such handling.

A further object is to provide an apparatus for transferring gathered and oriented articles as a group.

Figure 1:
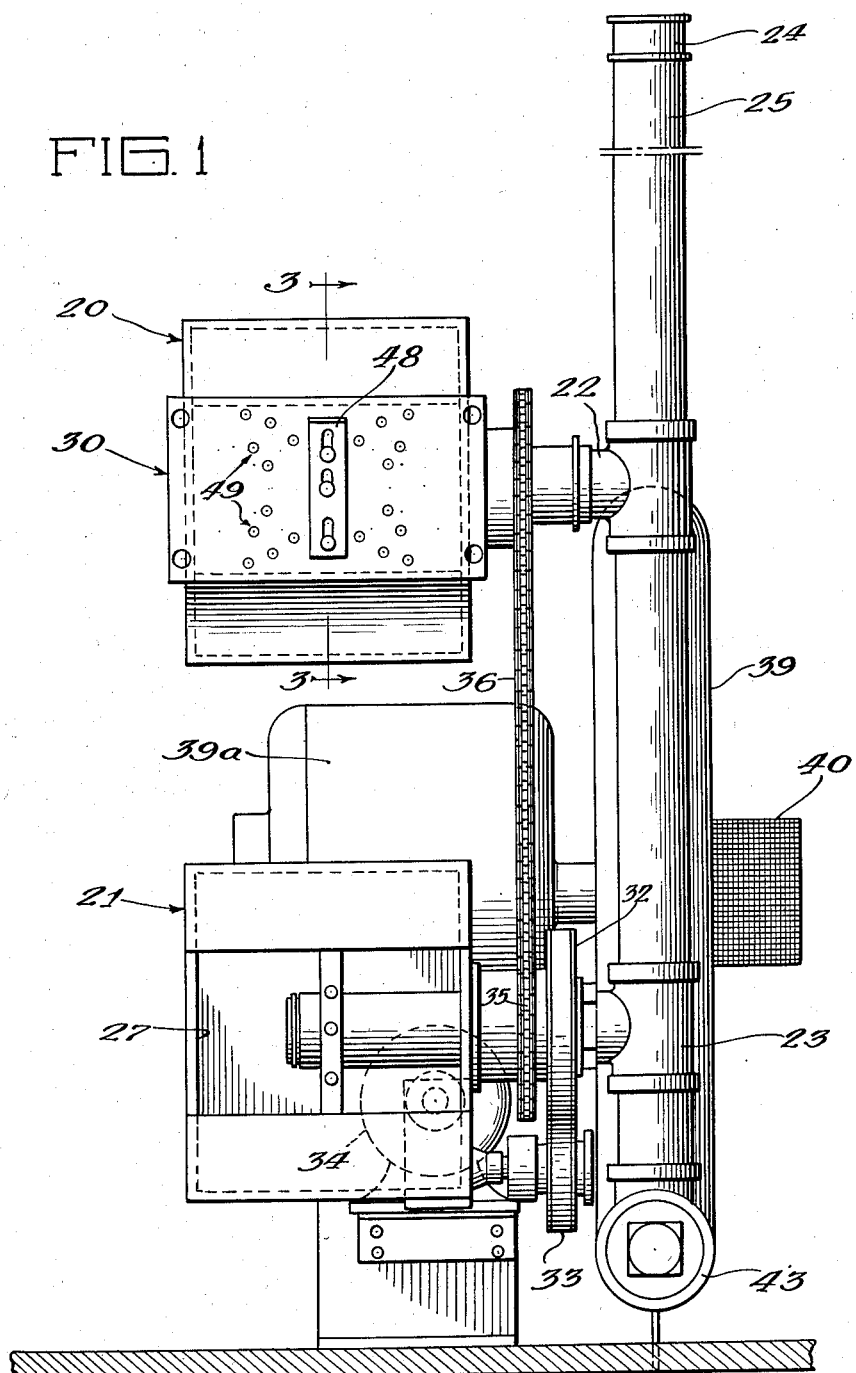
Figure 4:
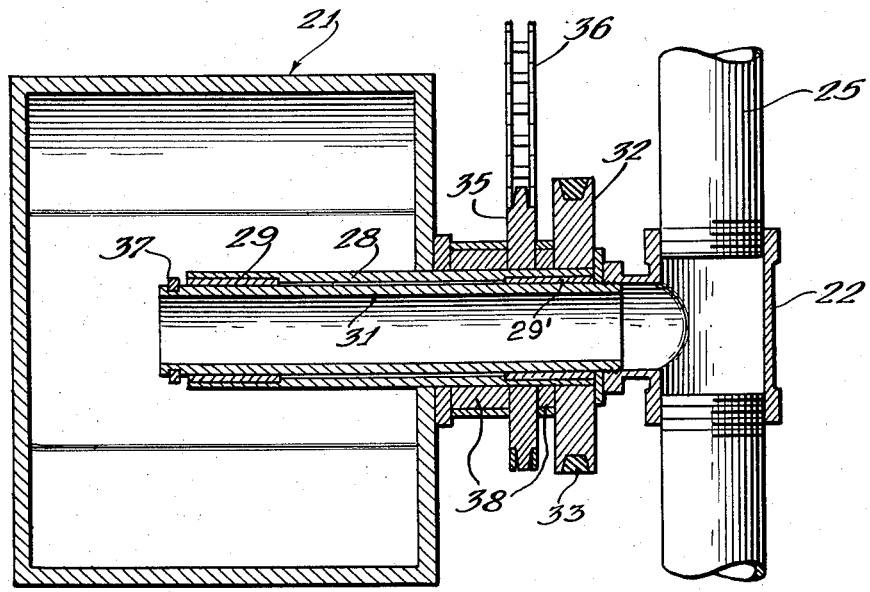
Figure 7:
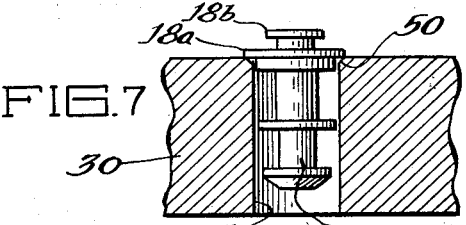
Figure 5:
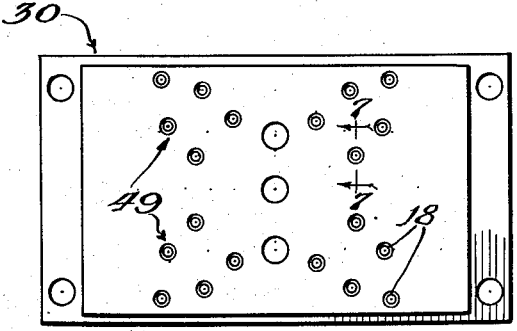
Figure 8:
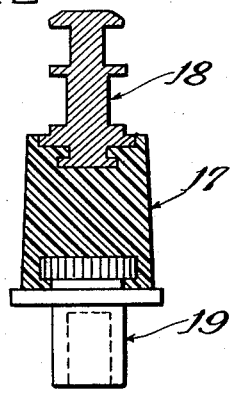
Figure 6:
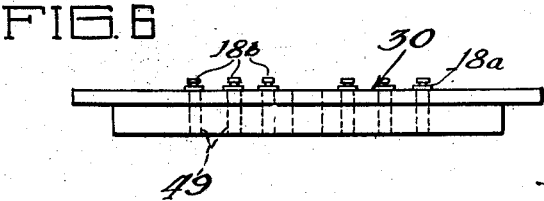

Other objects, features and advantages of the present invention will be apparent from the following description of preferred embodiments illustrated in the accompanying drawing, in which:

Figure 1 is a front elevational view of an apparatus for carrying out the present method and for gathering and orienting relatively small articles, Figure 2 is a side elevational view partially broken away from the apparatus illustrated in Figure 1, Figure 3 is a sectional view through a tumbling barrel taken substantially along line 3—3 in Figure 1, Figure 4 is a fragmentary sectional view through a tumbling barrel taken substantially along line 4—4 in Figure 2, Figure 5 is a plan view of the innerface of an article receiving plate used with the tumbling apparatus, Figure 6 is a side elevational view of the plate shown in Figure 5, Figure 7 is a fragmentary sectional view through one of the orifices of the plate taken substantially along line 7—7 in Figure 5, Figure 8 is a much enlarged elevational view partly in section through a standoff terminal showing the final product in which the articles handled in the barrels are incorporated, Figure 9 is a sectional view through the transfer mechanism taken substantially along line 9—9 in Figure 10, Figure 10 is a side elevational view of the transfer mechanism shown in relation to a carrier plate shown fragmentarily, Figure 11 is a fragmentary end elevational view of the transfer mechanism illustrated in Figure 10, Figure 12 is a fragmentary sectional view through a portion of the transfer mechanism taken substantially along line 12—12 in Figure 10, Figure 13 is a view similar to Figure 12 showing the mechanism gripping an insert, Figure 14 is a diagrammatic side elevational view of an alternate form of drum and its drive mechanism, Figure 15 is an end elevational view of the drum illustrating its extreme positions in dotted outline, and Figure 16 is a front elevational view of the drum alone with its doors removed.

The specific apparatus chosen for illustrating the invention is concerned with gathering and orienting small inserts which form a part of an electrical insulated standoff terminal. In Figure 8 of the drawings, a completed standoff terminal is shown as having a plastic insulating body 17 which is molded about an upper post insert 18 of metal to which electric wires may be connected and a supporting metal piece 19 used for connecting the standoff terminal to a base. In the molding operation, the inserts 18 and 19 must be placed in cooperating parts of a plastic mold or die so that the plastic body 17 may be formed about the inner ends of the inserts. The particular standoff terminal illustrated is much enlarged in the drawing and its actual full size is about $9/16''$ long. It will be immediately apparent that the insert parts thereof are quite small and accordingly difficult to handle.

In the past, the insert pieces have been manually placed and oriented in the molding dies. This work has been tedious and difficult to perform at any appreciable rapid rate. The molds are generally of the multiple cavity type in which several standoffs would be formed at one time. This necessitated the placing of quite a few of the inserts in the open mold before it could be closed and the plastic set around the inner ends of the insert parts.

In the method of the present invention a mass of the tiny articles are placed in a drum for tumbling past orifices shaped to receive and orient the articles. The orifices are arranged in a pattern corresponding with the pattern of a molding die so that they may be merely transferred as a group to the die without manually placing each insert in the die.

In order to induce the articles to enter the orifices, air is caused to flow through the open orifices in a stream which tends to catch and draw the article into the orifice. Once properly positioned, the article will block the orifice and be held in place by air pressure within the drum.

An apparatus found suitable for carrying out the present invention is illustrated in general in Figures 1 and 2. Tumbling drums 20 and 21 are rotatably mounted on a pipe connected to a T 22 and 23 respectively in upstanding air pipes 24 and 25. The drums illustrated have a plurality of similar sides 26 forming a generally hexagonally shaped drum having an open side such as illustrated at 27 on the drum 21 which may be closed by an article carrier plate 30. The specific mounting of the drum is illustrated in Figure 4 wherein a sleeve 28 is secured to the drum proper and rotates upon bearings 29 and 29' on an inner pipe 31 attached directly to the T 22. The belt pulley 32 is also secured thereto for being driven by belt 33 and motor gear set 34. A sprocket 35 also attached to the drum, may drive the upper drum 20 through the means of a chain 36. The construction of the drums is similar with suitable provision being made for retaining the drums on the pipes 31 as by a snap ring 37 and for spacing the sprockets and pulleys as by spacers 38.

Air is supplied to the drums through the pipes 24 and 25 and the T's into the interior of the drum through the supporting pipe 31. The air may be blown into the pipes by a centrifugal blower 39 having a motor 39a and an intake 40 as illustrated in Figure 1. The air outlet 41 connects into T's 42 and 43 connecting with the upwardly extending pipes. It is desirable to maintain a predetermined air pressure within the drums in the operation of gathering and orienting inserts in the carrier plate 30. In order to accomplish this, a type of pop-off or relief valve is provided on each upstanding pipe. A plate 44 across the open upper end of the pipe is connected by a rod 45 extending downwardly through the pipe and through the lower T to a platform 46 upon which weights 47 may be removably placed. By varying the weight, the pressure within the drum may also be varied. Blower 39 is driven at a generally constant speed by its motor 39a and has generally a constant output; however, the valves just described permit an easy automatic control of the pressure within the drums.

The air pressure and the speed of rotation of the drums are both variables depending in part upon the size and weight and shape of the particular article being gathered. As illustrated in Figures 1 and 3 the plate 30 has a latch 48 for removably connecting it to the drum. A supply of inserts I is shown in the drum in Figure 3 for entering the groups of orifices 49 which have an individual shape as illustrated in Figure 7. The orifice is generally a straight bore having a slight chamfer 50 around its inner periphery. The insert 18 illustrated in Figure 7 is in proper position to block the orifice 49. Its flange 18a is larger than any other part and therefore prevents the insert from falling through the orifice.

In operation, it has been found that air at a few inches of water superatmospheric may be maintained in the drum while it is slowly rotated to pass the inserts over the carrier plate 30 and load the orifices 49. The air pressure should be sufficiently great to hold the insert in proper position blocking the orifice even though the plate be upside down and yet not sufficient to hold an insert over an orifice crosswise. The mass of inserts in the drum generally will wipe or brush off any improperly positioned insert. Those that are in proper position as illustrated in Figure 7 however, will not be disturbed by the passing of the mass of inserts thereover. Air pressures for relatively small articles in the range of 3 to 6 inches of water has been found adequate while slightly larger articles may require higher pressures of several times this amount. Rotation of the drum at about 15 r.p.m. for a 10 inch drum has also proved satisfactory. Also, slower speeds are efficient in loading the orifices with inserts.

It has been observed that the air escaping through the orifices has a tendency to draw a properly positioned insert into the orifice quite rapidly. In handling some articles, it has been found expeditious to cause the articles to pass back and forth over orifices without excessive tumbling, as would occur in rotating the drum of Figure 1. Thus, in Figures 14 to 16 a drum having an oscillatory rotative motion is illustrated. The drive is from a rotating crank 51 through an arm 52 which gives a disc 53 about 100° of oscillation. A 2 to 1 ratio allows disc 54 through a chain 55 to drive the drum 56 by a small disc 57 through approximately 200°. The extreme positions of the drum are illustrated at 56a and 56b in Figure 15. The drum itself has a large door opening 58 with a small front panel 59 at the bottom of the door for the purpose of keeping inserts within the drum when the door is removed. It should be noted that inserts moving from the left to the right when the drum is in the position of 56a, will immediately pass backwardly in the opposite direction over the drum door because of the reversal in motion of the drum. Thus, if some inserts are faced the wrong direction for entering the orifices as they initially pass over the door to position 56a, the immediate reversal of direction will pass these inserts back over the door in the proper direction for entering the orifices.

The drum 56 illustrated in Figures 14 to 16 may have a similar supporting shaft 60 having bearings (not shown) for mounting it upon a pipe 61 as was described for the drum 21.

Once the inserts have been gathered into a pattern such as illustrated in Figures 5 and 6, they may be transferred to a molding die or another fixture for some subsequent manufacturing step. The inserts are gathered into the orifices quite rapidly, some carriers 30 being filled within 30 seconds up to about one minute of rotation or oscillation. Following the stopping of the drum motion, the drums are put in a position that the carriers will retain the inserts by gravity when the air pressure is released. The carrier is then removed from the drum exposing the upper ends 18b of the inserts as illustrated in Figure 7. The transfer device may be used for moving the inserts as a group from the carrier 30 to some other location. Figures 9 through 13 illustrate the transfer mechanism and its function. A plate member 62 carries a plurality of split sleeves 63 fastened thereto by a cooperating shoulder and nut and arranged in a pattern such as illustrated in Figure 9. The particular pattern illustrated is one different from that illustrated in the carrier of Figure 5 to indicate that the orifices may be arranged in various configurations. In any event, the particular carrier to be used with a particular molding die will have its split sleeves arranged quite accurately in the same pattern as the cavities in the die. Guide pins 64 are provided on either side of the transfer device for aligning it with either a carrier or a die. The latter two are provided with accurately positioned openings for receiving the guide pins 64 as illustrated in Figure 11. A plunger plate 65 is secured to the plate member 62 by a plurality of bolts 66 having compression springs 67 for yieldingly urging the two plates apart. Plunger pins 68 are secured to plate 65 in position to enter each split sleeve. As illustrated in Figure 13, the split sleeves are in position to grasp the upper part 18b of an insert, and the plunger may be caused to enter the sleeve to effect a release of the insert. Ordinarily, the transfer device is handled manually, aligned with a carrier and pressed thereagainst to pick-up inserts in a group. The transfer device is then aligned with the mold and the plates pressed together against the springs 67 to cause a deposit of all of the inserts in the mold.

The apparatus of the present invention when operated in accordance with the method outlined can gather and orient relatively small articles quite rapidly. The use of the transfer mechanism permits the handling of the articles in a group, thus materially reducing the time and cost of processing such small articles. Articles of light weight materials, such as plastics, generally require less air pressure to cause them to enter the orifices than do heavier parts such as those made of metal. The present method may be used to gather and orient small articles of many different shapes and sizes and is particularly advantageous with small articles otherwise difficult to handle. Additionally, two different sizes of articles mixed together may be separated by providing a carrier plate with orifices of a size to accommodate only one size. Repeated tumbling steps may effect a desired separation of the different sizes in this manner.

The foregoing detailed description has been given for clearness of understanding only, and no unnecessary limita-

I claim:

1. The method of positioning articles in predetermined position, comprising: inclining a plate relative to horizontal, said plate being provided with bores to receive and retain the articles in a predetermined pattern; initiating flow of air through the bores; and passing the articles in mass across and over the plate to allow individual articles to be drawn into the bores and to brush off articles improperly positioned over a bore, and maintaining the properly positioned articles in the bores by air pressure during said passing.

2. An apparatus for gathering relatively small articles, comprising: a tumbling barrel having an opening permitting loading a plurality of the articles in the drum; an article carrier attached to the drum and having orifices therein communicating with the interior of the drum; means for introducing superatmospheric air into the drum for flow outwardly through the orifices; and drive means for turning the drum and tumbling the articles repeatedly over the orifices permitting the air to draw the articles into the orifices, said carrier being removably attached to the drum for transferring so gathered articles from the drum.

3. An apparatus as specified in claim 2 wherein the drum has flat sides for moving the plurality of articles non-uniformly as the drum is rotated and the carrier is a flat plate forming one side of the drum.

4. An apparatus as specified in claim 2 wherein the drum drive means includes a crank for imparting oscillatory rotary motion to the drum arranged to reverse the direction of travel of the drum at one extreme immediately following the passing of the articles over the orifices.

5. An apparatus as specified in claim 2 wherein the drum is mounted upon a hollow shaft support and is turned about the shaft to tumble the articles therein, said air being introduced through the shaft to the interior of the drum.

6. An apparatus as specified in claim 2 wherein the carrier orifices are arranged in a pattern and the carrier is provided with aligning means for orienting the carrier with an article loader having cooperating aligning means and individual finger members for gripping and lifting the articles out of the orifices.

References Cited in the file of this patent

UNITED STATES PATENTS

| | | |
|---|---|---|
| 568,201 | Latham | Sept. 22, 1896 |
| 572,340 | Estabrook | Dec. 1, 1896 |
| 899,760 | Remington | Sept. 29, 1908 |
| 1,062,608 | Moritz | May 27, 1913 |
| 2,372,325 | Hein | Mar. 27, 1945 |